United States Patent [19]

Shibaike et al.

[11] Patent Number: 4,517,613
[45] Date of Patent: May 14, 1985

[54] MAGNETIC RECORDING AND PLAYBACK APPARATUS

[75] Inventors: Narito Shibaike, Habikino; Seiko Minamide, Nara; Satoshi Kikuya, Katano; Hiroshi Terada, Hirakata; Osamu Zaitsu, Neyagawa, all of Japan

[73] Assignee: Matsushita Electric Industrial Co., Ltd., Osaka, Japan

[21] Appl. No.: 388,939

[22] Filed: Jun. 16, 1982

[30] Foreign Application Priority Data

Jun. 24, 1981 [JP] Japan .................................. 56-97876

[51] Int. Cl.$^3$ ................................................ G11B 5/08
[52] U.S. Cl. .......................................... 360/85; 360/95
[58] Field of Search ................................. 360/85, 95

[56] References Cited

U.S. PATENT DOCUMENTS

| | | | |
|---|---|---|---|
| 3,818,503 | 6/1974 | Hosono et al. | 360/85 |
| 3,984,870 | 10/1976 | Inoue | 360/85 |
| 4,357,639 | 11/1982 | Hama | 360/95 X |

Primary Examiner—John H. Wolff
Attorney, Agent, or Firm—Stevens, Davis, Miller & Mosher

[57] ABSTRACT

In the magnetic recording and playback apparatus of the invention, a cassette is mounted in parallel with a base plate. The apparatus has a tape path which is optimized for stable tape running and tape protection and having three inclined planes of different inclination directions and angles with respect to the plane of the base plate. A cylinder is arranged perpendicularly to the first inclined plane, while a first guide post and an eraser head are arranged perpendicularly to the third inclined plane. A capstan, sound/control head and a second guide post are arranged perpendicularly to the second inclined plane.

6 Claims, 17 Drawing Figures

F I G. 13
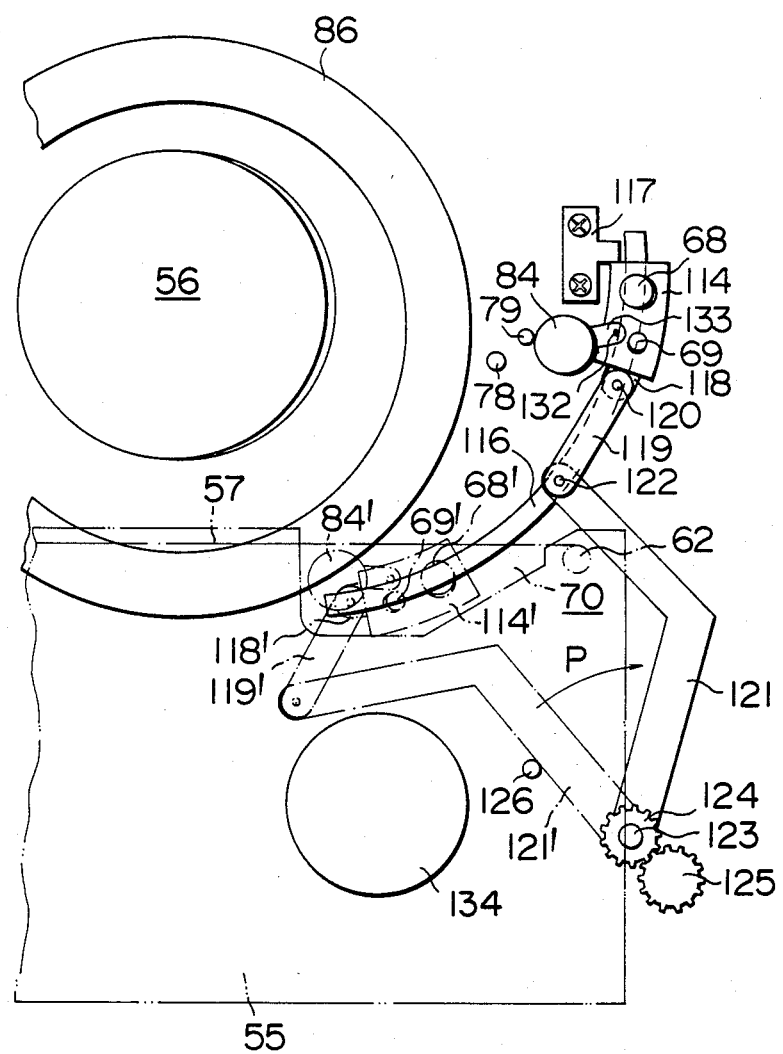

MAGNETIC RECORDING AND PLAYBACK APPARATUS

BACKGOUND OF THE INVENTION

1. Field of the Invention

The present invention relates to a so-called helical scanning type magnetic recording and playback apparatus in which a magnetic tape is helically wound at a predetermined helical angle around a cylinder incorporating rotary heads therein. The apparatus will be referred to as a VTR, hereinunder.

2. Description of the Prior Art

In the helical scanning type VTR employing a two-reel cassette incorporating therein two parallel reels encased by a cassette case, there is a difficulty in stably feeding the tape into the cassette because the tape tends to be twisted at both sides of a cylinder incorporating therein a rotary head when the tape is helically wound around the cylinder. The tape leaving the cassette passes around various posts and heads, being wound around the cylinder and emerging therefrom and after passing various posts and the heads, goes back again into the cassette. This running path is usually referred to as "tape path". The operation of shifting the tape in the cassette to the predetermined tape path is called "loading". Hitherto, a so-called M-type loading system and a U-type loading system have been used as the major loading systems. These loading systems respectively define completely different tape paths which have advantages and disadvantages peculiar thereto. The M and U type tape path arrangements will be explained hereinunder as typical prior art examples with specific reference to FIGS. 1 and 2.

Referring first to FIG. 1 showing an M type loading system, a reference numeral 1 designates a cylinder, 2 designates a cassette, 3 designates a capstan, 4 designates a capstan fly-wheel disposed behind a base plate (not shown) and 5 designates a pinch roller. The tape 6 is wound, within the cassette 2, around a supply reel 10 as well as a take-up reel 11 and is stretched therebetween through guides 7, 8 and 9 in front of the cassette 2 as shown by the one-dot-and-dash line. As the cassete 2 is mounted on the VTR and the tape loading is commenced, tape loading posts 13',14' and a tension post 15' received by a first notch 12 formed in the front side of the cassette 2 are moved to positions designated at 13,14 and 15 respectively, while loading posts 17',18' received by the second notch 16 are moved to positions designated at 17 and 18. As a consequence, the VTR is loaded with the tape 6 along the established tape path as illustrated. At the same time, the capstan 3 is received into a third notch 19 therefor. Reference numerals 20,21 and 22 denote stationary heads, 23,24 denote impedance rollers and 25,26,27 denote guide posts.

This tape path is such that the components other than the cylinder 1 and the loading posts 14,17 are mounted perpendicularly to the base plate. Namely, the twisting and the height qifferential of the tape caused by the winding of the tape around the cylinder 1 are eliminated by suitably selecting the inclination angle and direction of the cylinder 1 and by declining the loading posts 14 and 17 relatively to the tapes. More specifically, the elimination of the twist in and the height difference of the tape is achieved as follows.

The cylinder 1 is inclined in the direction of an arrow X. The direction which makes a right angle, that is: 90°, to the direction of the arrow X constitutes the bisector of the total winding angle of the tape. Namely, the following conditions are met in connection with FIG. 1.

$$\theta_X = 90° \quad \theta_1 = \theta_2$$

A tape guide formed in the pherepheral surface of the cylinder 1 is provided such that its level is gradually lowered from the tape inlet point to the tape outlet point B, and the inclination angle of the cylinder is however selected such that the point A is positioned at a level somewhat below that of the point B in the inclined posture of the cylinder 1. Namely, the tape is raised from the point A to the loading post 14 and is wound at an inclination angle around the loading post 14 so that the twist in the tape is eliminated and the level of the tape becomes flush with the tape in the cassette. The tape becomes perpendicular to the base plate at this moment so that the posts and the heads disposed between the cassette 2 and the loading post 13 stand perpendicularly to the base plate.

By setting the direction of inclination of the cylinder 1 in the way explained above, the portions of the tape at both sides of the cylinder 1 take a form symmetrical with respect to the cylinder 1. Since the mid point C of the tape wound round the cylinder 1 takes the same level as the tape in the cassette, the tape is gradually lowered as it runs from the point B to the loading post 17 and passes around the loading post 7 at an inclination angle so that the twist of the tape and the height differential are eliminated when the tape reaches the loading post 18. Therefore, the tape path downstream from the loading post as viewed in the direction of running of the tape is constituted by posts and heads perpendicular to the base plate.

As will be understood from the foregoing explanation, all components except the cylinder 1 and the inclined loading posts 14,17 can be mounted perpendicularly to the base plate. This advantageously permits the thickness of the VTR to be reduced. Another advantage is that the tape path occupies only a small degree, due to the fact that there is almost no height differential between tape portions on both sides of the cylinder. This is quite advantageous from the view point of reduction in size and thickness of VTRs.

On the other hand, the M type loading system has some disadvantages or drawbacks as stated hereinbelow. First of all, the tape has to be wound over a considerably large angle around the inclined loading posts 14,17 for eliminating the twist in a tape on both sides of the cylinder 1. These posts, however, cannot be replaced by rollers because the tape has to be wound helically. The large angle of winding of the tape causes a large friction which increases the tension resulting in that a larger driving torque is required and the tape is adversely affected. Another problem resides in that the inclined loading post 17 is disposed between the outlet point B and the capstan 3. Namely, the fluctuation component of movement of the tape caused by the inclined loading post 17 and, as well, the fluctuation component of the tape movement caused by the loading post which is formed as a roller to reduce the driving torque, are transmitted to the stationary head 22. In addition, it is necessary to provide an impedance roller 24 to suppress the fluctuation component. In addition, the guide post 27 between the capstan 3 and the stationary head 22 cannot employ a roller so that the driving torque is increased further. The control of the tape length between the cylinder 1 and the stationary head 22 is made difficult due to the necessity for the tape loading and the presence of the rollers. This in turn requires an extremely high precision of positioning of the loading posts 17 and 18, making assembly difficult. Finally, it is to be pointed out that the tape is liable to be damaged during a loading operation. This is due to the fact that the tape 6 is not directly wound round the cylinder 1 along the tape guide in the cylinder 1, because the loading is made in parallel to the base plate.

In consequence, the M type loading system is suitable for reducing the size and thickness of a VTR, but requires high precision to ensure a smooth tape running and to protect the tape, resulting in some difficulty in simplification of construction and reduction in cost.

Referring now to FIG. 2 showing a U type loading system, a reference numeral 28 denotes a cylinder, while 29 denotes a cassette. Within the cassette 29, the tape 30 wound on a supply reel 31 and a take up reel 32 and stretched therebetween via tape guides 33,34,35 and 36 As the cassette is mounted in the VTR, a notch 37 in the front surface of the cassette 29 receives a tension post 38', loading post 39',40',41' and a pinch roller 42' which are then moved to the positions denoted by 38,39,40,41 and 42, respectively to effect the tape loading along the tape path. A reference numeral 43 denotes a capstan, while a capstan fly-wheel 44 is provided at the rear side of the base plate which is not shown. Reference numerals 45,46 and 47 denote stationary heads, while numerals 48,49,50,51 and 52 denote guide posts. A reference numeral 53 designates a loading ring, adapted to rotate in the direction D to effect the shifting of the pinch roller 42, loading posts 40,41 and another loading post 39.

The feature of the thus established tape path is such that the plane of running of the tape is largely divided into two parts. These two parts of the plane are simply the planes in which the twisted parts of the tape on both sides of the cylinder 28 exist. The tape coming out of the cassette 29 then runs to the cylinder 28 via the guide posts 48,49,50, the tension post 38 and the stationary head 45. The tape runs in parallel with the base plate to the cylinder inlet point E. Namely, there is one plane which is parallel to the base plate, and the members defining the tape path in this region to the inlet point E are mounted perpendicularly to the base plate. This plane will be referred to as "first plane". The direction and angle of inclination of the cylinder are naturally determined in order to smoothly wind the tape round the cylinder 28. Namely, the cylinder 28 is inclined by an angle equal to the guide angle in the direction Y which is parallel to the tape portion between the guide post 50 and the inlet point E.

In the drawings, this relation is represented as follows.

$\theta_Y = 90°$

The cylinder is inclined in the direction Y since the tape guide is provided such that the tape is gradually lowered from the inlet point E to the outlet point F. To the contrary, the cylinder should be inclined in the opposite direction, i.e. in the direction 180° in opposite to the direction Y, if the tape guide is so provided that the tape gradually rises as it runs from the point E to the point F. The tape goes round the cylinder 28 by an angle $\theta_3$ and leaves the same at the outlet point F. In this state, the tape falls by an angle which is twice as large as the guide angle and, hence, is further twisted. Another plane exists as the plane containing this portion of the tape. The posts and heads disposed at least in the region to the capstan 43 and the pinch roller 42 are arranged perpendicularly to this plane. This plane will be referred to as "second plane". Therefore, the tape leaving the cylinder 28 runs without any twisting in the second plane to reach the capstan 43, although the tape portion in this region is twisted relatively to the base plate.

The loading ring 33 also exists in this second plane. The pinch roller 42 and the loading posts 40,41 are perpendicularly held on the loading ring 53.

After leaving the pinch roller 42 and the capstan 43, the tape is returned back into the cassette 0 29 via the loading posts 41,40 and 39. In this returning operation, the tape has to be wound round a certain post in order to return the tape from the second plane to the first plane. In the case of the U type system, however, the tape is driven by being pinched 5 between the capstan 43 and the pinch roller 42 and, thereafter, is merely sent to the cassette 29. Therefore, even if the running of the tape is slightly unstabilized to cause a fluctuation in the running speed, the fluctuation component is stopped by the capstan 43 and the pinch roller 42 almost perfectly and, hence, the head disposed at the upstream side of the pinching point is not affected substantially. Therefore, in most cases, the loading posts 41,40,39 are mounted with a certain play, and a rather "free" tape path is formed in most cases by making positive use of the elasticity of the tape and the tape length down to the cassette which is very large as compared with the tape length in the M type system. This will probably impose a serious problem when as the future demands a more precise tape running system and a reduction in thickness of the VTR. This problem, however, can be overcome by the use of an inclined post so that any further discussion in this connection is omitted here.

As will be understood from the foregong description, one of the advantages of the U type system is that the latter is free from the twist of the tape between the cylinder outlet point F to the capstan 43 mentioned before as a disadvantage of the M type system. Furthermore, since there is no loading post between the outlet point F and the capstan 43, and since there is no need for roller in this region, the transmission of fluctuation component in the tape running to the stationary head is suppressed. In addition, since the components of the tape path are all stationary, the distance between the cylinder head 28 and the stationary head 47 is maintained always constant. This in turn makes the requirement for the precision of location of the loading post less severe as compared with the case of the M type system. Furthermore, the tape tension and, hence, the driving torque are very much decreased because there is no stationary post for eliminating the twisting of the tape.

Thus, the drawbacks of the M type system can be overcome by the U type system. Similarly, the drawbacks of the U type system can be overcome by the advantages of the M type system. Namly, the major parts such as the capstan 43, the pinch roller 42, the guide posts 51,52, the stationary heads 46,47 and the loading ring 53 are inclined at a considerably large angle which is about twice as large as that of the guide angle, to seriously hinder the reduction of thickness of the VTR. Also, as to the tape path, the height differential between the tape portions of both sides directly forms the thickness of the tape path and, as the distance to the capstan 43 is increased, the tape descends in the second plane by a large depth so as to further increase the space occupied by the tape path. In addition, a problem similar to that in the M type system is caused in the second plane by a large height so as to further increase the space occupied by the tape path. In addition, a problem similar to that in the M type system is caused in connection with the tape protection, because the loading post 40 and the pinch roller 42 are held by the loading ring 53. furthermore, since the pinch roller 42 has to be movable, it is comparatively difficult to correctly press the pinch roller 42 against the capstan 43 and the construction can be rendered impractically complicated.

In consequence, the U type loading system is considered suitable for forming a tape path advantageous for the tape running but involving a problem concerning the tape protection and a serious problem in regard to the reduction in size and thickness of the VTR.

As have been described, the M type system and the U type system oppose each other in their advantages and disadvantages, and suffer a common problem concerning the protection of tape.

On the other hand, there is an increasing demand for a reduction in the size and thickness of a VTR, as well as for a higher density of recording and higher performance. The conventional M type loading system or U type loading system solely cannot meet this demand. This in turn gives a rise to a demand for a novel tape loading system in which the disadvantages of the M type and U type systems are eliminated while maintaining the advantages of these systems.

BRIEF SUMMARY OF THE INVENTION

Object of the Invention

Accordingly, it is a primary object of the invention to propose a tape path which is extremely advantageous for the reduction in size and weight of the VTR, as well as for tape running and protection, and is most suitably usable for helical scanning type VTRs using two parallel reel cassettes.

To this end, according to the invention, there is provided a VTR having a base plate adapted for mounting reel bases vertically and a cassette in parallel therewith, three inclined planes of different directions of inclination, having different inclination angles with respect to the base plate, the first inclined plane carrying a cylinder incorporating therein rotary heads and arranged perpendicularly thereto, the second inclined plane carrying a second guide post, a sound/control head head and a capstan arranged perpendicularly thereto and the third inclined plane carrying a first guide post and an eraser head arranged perpendicularly thereto, and a pinch roller adapted to be arranged perpendicularly to the second inclined plane during running of the tape, so that a tape path is realized which permits a further reduction in size and weight of a VTR as well as the tape running and further providing tape protection.

BRIEF DESCRIPTION OF THE DRAWINGS

FIG. 13 is a plan view of an essential part of the loading arrangement in accordance with the invention;

DESCRIPTION OF THE PREFERRED EMBODIMENTS

A novel tape path in accordance with the invention, as well as an example of a tape loading mechanism for realizing such novel tape path, will be explained hereinunder with reference to the accompanying drawings.

Figure 1:
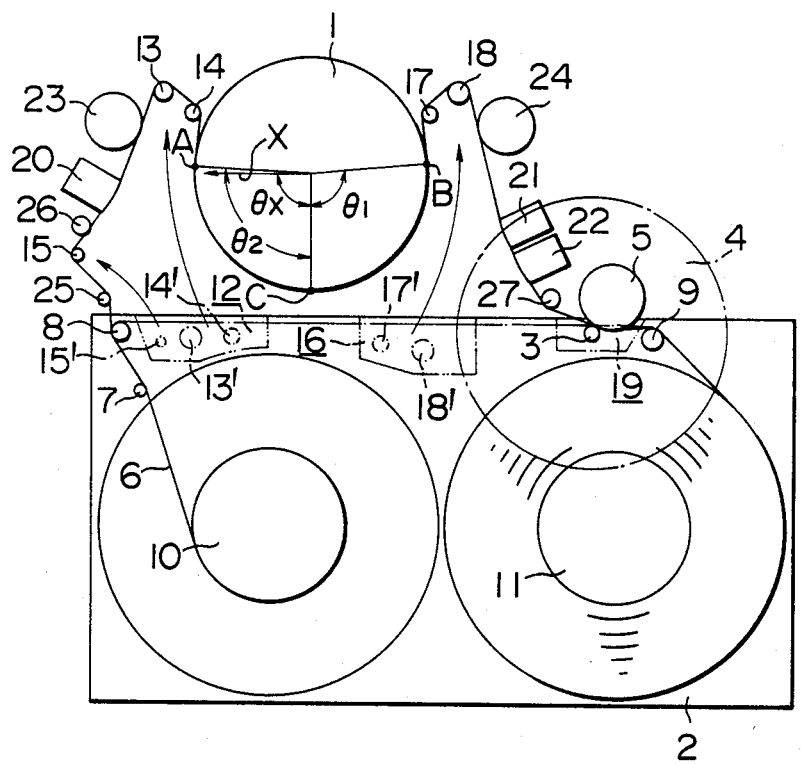
FIG. 1 is a plan view illustrating a conventional M type tape loading system.
Figure 2:
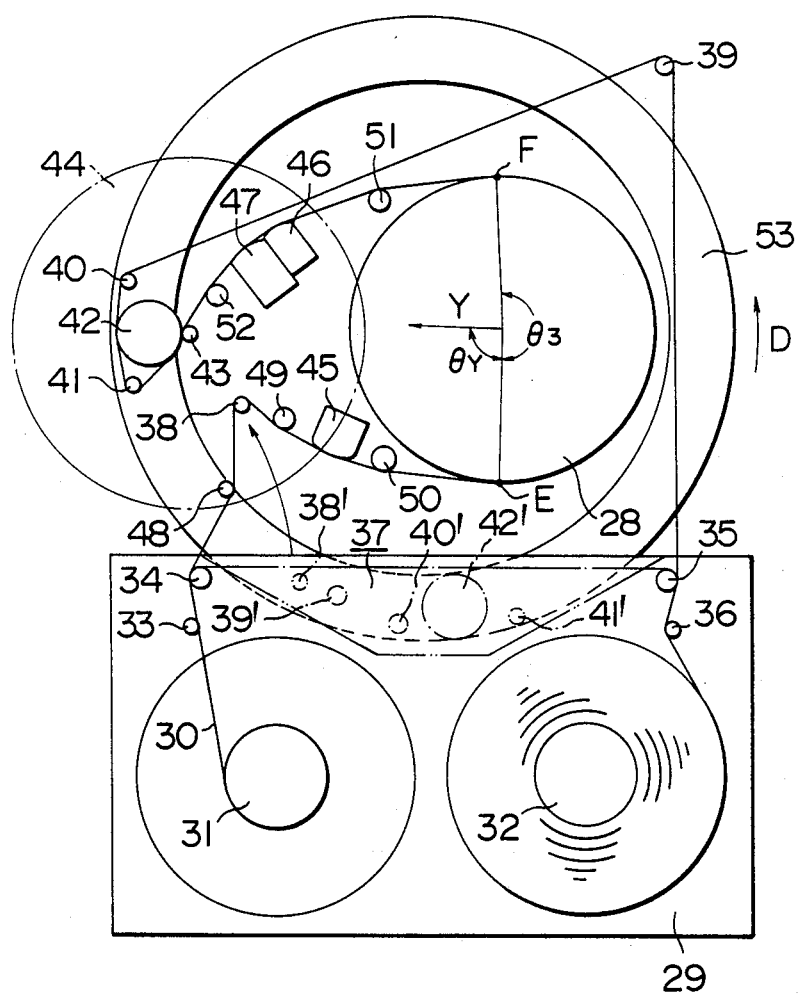
FIG. 2 is a plan view illustrating a conventional U type tape loading system.
Figure 3:
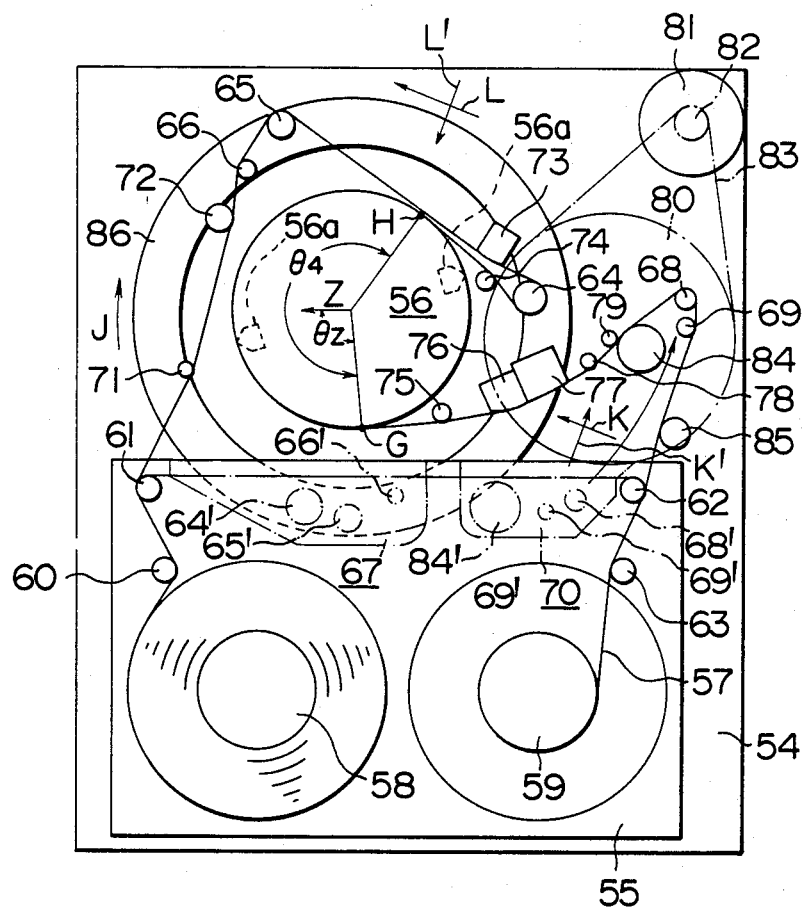
FIG. 3 is a plan view illustrating a tape path in accordance with the invention.

Referring first to FIG. 3 showing a tape path in accordance with the invention, a cassette 55 is mounted on a plane extending in parallel with the base plate 54, and a cylinder 56 is secured at a predetermined inclination angle in the direction Z. Preferably, this inclination angle is slightly greater than the guide angle. In addition, the tape winding angle $\theta_Z$ between the outlet point G and the direction Z of inclination has to be an angle which is other than 90°, but it is necessary that the following condition is met.

$$\theta_Z > 90°$$

Due to this relationship between the direction of inclination and the angle of inclination, the tape after leaving the cylinder 56 does not exist in the plane parallel to the base plate 54. The plane on which the cylider 56 is mounted will be refered to as a first inclined plane. The cylinder 56 is the sole member which is mounted on the first inclned plane perpendicularly thereto. At least two rotary heads 56a for recording video signals are incorporated in the cylinder 56. Within the cassette 55, the tape is supplied from a supply reel 58 to a take-up reel 59 via tape guides 60, 61, 62 and 63, and is stretched in front of the cassette 55 between the tape guides 61 and 62.

In tape loading operation, a notch 67 receives a loading post 64', loading post 65' and the inclined post 68', inclined loading post 69 ' and a pinch roller 84', and these members are moved to the positions designated at numerals 64,65,66,68,69 and 84 to complete the tape loading. A reference numeral 71 denotes a tension post adapted to contact the tape 57 from the outer side of the tape path, 72 denotes a movable guide post, 73 denotes a movable eraser head and 74 denotes a fixed first guide post. Having left the cassette 55, the tape 57 reaches the cylinder inlet point H past the posts and the head mentioned above and, after winding round the cylinder 56 over an angle $\theta_4$, comes out of the cylinder through the outlet point G. The tape then receives the capstan 79 past a fixed second guide post 75, a sound eraser head 76, a sound/control head 77 and a guide post 78. On the rear side of the base plate 54, a capstan fly-wheel 80 is formed integrally with the capstan 79. The capstan fly-wheel 80 is driven by a belt 83 which is stretched between the capstan fly-wheel 81 and a pulley 82 fixed to a capstan motor 81. A reference numeral 84 designates a pinch roller. In this case, the loading has to be made from the inner side of the cassette 55 because the pinch roller 84 is positioned within the tape loop. The tape 57 pinched between the pinch roller 84 and the capstan 79 is returned into the cassette 55 past a loading post 68 and the inclined loading post 69 and then passes round a guide post 85.

A reference numeral 86 denotes a loading ring which is adapted to be rotated in a plane parallel to the base plate 54, thereby to shift the laoding post 64, the loading post 65 and the inclined loading post 66 in the direction of an arrow J and, due to its peculiar cam contour, to move the movable guide post 72 and the movable eraser head 73 away from the tape path constituted by various loading posts.

As stated before, the tape runs in planes twisted in relation to the base plate 54, at both sides of the cylinder 56 due to thge peculiar direction and angle of inclination of the cylinder 56. In this regard, the tape path of this embodiment of the invention is analogous to that of M type, but the tape path as a whole resembles that of U type. In addition, the cylinder 36 is inclined in such a direction as to be slightly declined towards the tape winding side from the direction of inclinization in the U type system, in sharp contrast to the M type in which the cylinder is inclined in the direction 90° in opposite to the bisector of the tape winding angle. Therefore, in the tape path of the described embodiment, the degrees of twisting of the tape on both sides of the cylinder 56 are considerably different from each other. The cylinder 56 is provided with such a tape guide as to descend from the inlet point H to the outlet point G. Namely, the tape leaving the cylinder 56 for the capstan 79 runs in a plane which is inclined relatively to the base plate 54 only slightly. This plane will be referred to as a second inclined plane. The tape runs along this second inclined plane in a somewhat ascending manner but the inclination of the tape is corrected as the latter goes round the inclined loading post 69 obliquely. As a result, the tape comes again to run along a plane parallel to the base plate 54 towards the cassette 55. Thus, the components of the tape path mounted perpendicularly to the second inclined plane are the guide posts 75,78, the sound eraser head 76, the sound/control head 77, the pinch roller 84, the capstan motor 81, the pulley 82, the belt 83, the capstan fly-wheel 80, the tape drive system of the capstan 79 and the loading post 68.

Figure 4:
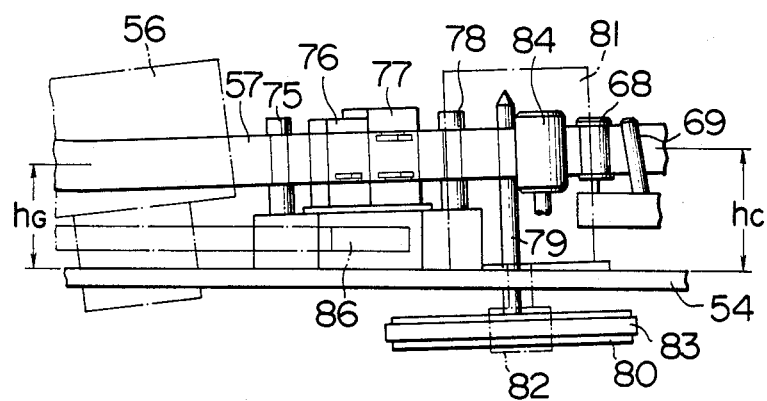
FIG. 4 is a side elevational view of the second inclined surface in the tape path shown in FIG. 3.

The inclined loading post 69 is inclined in a predetermined direction by a predetermined angle calculated for the correction of the posture of the tape. The direction of inclination of the second inclined plane is designated at K and the arrangement of various components as viewed from the view point K′ is shown in FIG. 4.

The above-mentioned components are mounted perpendicularly to the second inclined plane which is slightly inclined to the base plate 54, and the tape 57 runs in parallel with the second inclined plane between the cylinder 56 and the inclined loading post 69. The tape driving system including the capstan 79 is wholly inclined to the base plate 54 but the angle of inclination is so small (1.5° to 2°) that the whole thickness of the apparatus is substantially equal to that of the apparatus in which the tape drive system would be mounted perpendicularly to the base plate 54.

Figure 5:
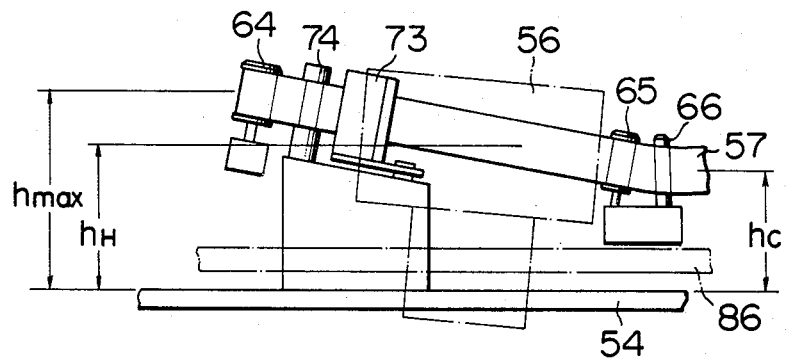
FIG. 5 is a side elevational view of a third inclined surface of the tape path shown in FIG. 3.

The manner of twist of the tape on the other side will be discussed hereinunder with reference to FIGS. 3 and 5. As stated before, there is a plane along which the tape comes into the cylinder inlet point H. This plane will be referred to as a third inclined plane. The loading post 65, the movable eraser head 73, the loading post 64 and a guide post 74 are mounted perpendicularly to this third inclined plane. The third inclined plane is inclined in the direction L as viewed in FIG. 3. The arrangment as viewed from the view point L′ is shown in FIG. 5. As will be seen from this Figure, the angle of inclination of this plane is somewhat greater than the inclination angle of the cylinder. The inclined loading post 66 is inclined in a predetermined direction by a predetermined angle calculated to put the tape leaving the cassette 55 and running in parallel with the base plate 54 into the third inclined plane. The tape is naturally put into the third inclined plane by being wound round this loading post 66. As has been stated, the tape path in accordance with the invention has three inclined planes inclined to the base plate 54 at different angles from the inclined angle of the cylinder 56, the second inclined plane is provided on the outlet side of the cylinder 56 and carries the capstan 79 and associated members and the third inclined plane is provided on the inlet side of the cylinder 56 and carries the loading post 64 and related members. The second and third inclined planes are defined by the direction and angle of inclination of the cylinder 56. The correction of twist of the tape 57 in the region between each of the second and third inclined plane and the cassette 55 is effected by the inclined loading post, so that the tape can run stably and naturally at every point in the tape running system.

If the tape path will be traced toward its upstream side. The height of the neutral axis (widthwise center) of the tape 57 in the cassette, as measured from the base plate 54, is represented by $h_C$. The tape 57 which has been shifted to the second inclined plane by being wound round the inclined loading post 69 gradually but steadily descends toward the cylinder outlet point G as shown in FIG. 4. Therefore, the tape height $h_G$ at the point G is clearly lower than the height $h_C$. Namely, the following condition is met.

$h_G < h_C$

This is attributable to the fact that the cylinder 56 is inclined at an angle which is somewhat greater than the tape guide angle. From the cylinder outlet point G, the tape 57 once descends relatively to the base plate 54 and then starts to ascend at an intermediate pont towards the inlet point H to meet the following condition.

$h_H > h_C > h_G$

Thus, the tape 57 takes the highest position $h_{max}$ when it goes round the loading post 64 during running along the third inclined plane. The tape then descends gradually and goes round the inclined loading post 66 to resume the same height as that $h_C$ in the cassette 55 and is reset to the plane parallel to the base plate 54 before going back to the cassette 55. The positions of two inclined loading posts 66 and 69 are determined in accordance with the relative height between the cassette 55 and the cylinder 56, more strictly by the tape guide on the cylinder 56, because the inclined posts have to be positioned in the vicinity of the lines of intersection between the plane in which the cassette 55 exists and the inclined planes formed at both sides of the cylinder 56, as will be described in detail hereinunder.

Figure 6:
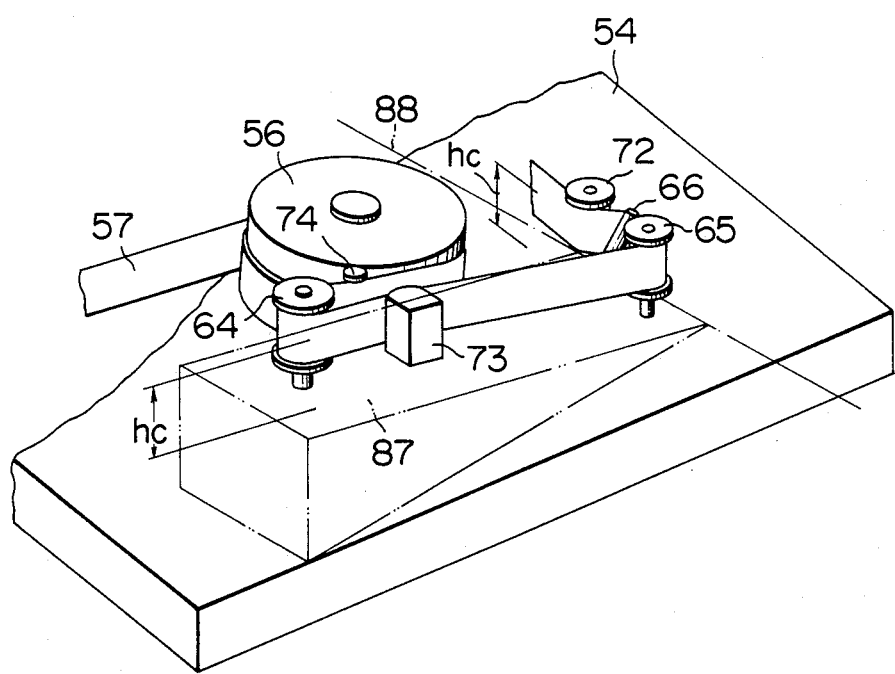
FIG. 6 is a perspective view illustrating the relationship between the third inclined surface and the base plate.

FIG. 6 shows the third inclined plane in relation to the base plate 54. Assuming that the third inclined plane 87 is defined at a point spaced by a distance $h_C$ from the tape 57, a line of intersection between the third inclined plane 87 and the upper surface of the base plate 54 appears as illustrated. The inclined loading post 66, which is intended to eliminate the height differential and the twist of the tape for returning the same from the third inclined plane to the cassette 55, has to be positioned in the vicinity of this line 88. This is clear from the fact that the height of the tape 57 from the base plate 54 has to be $h_C$.

Figure 7:
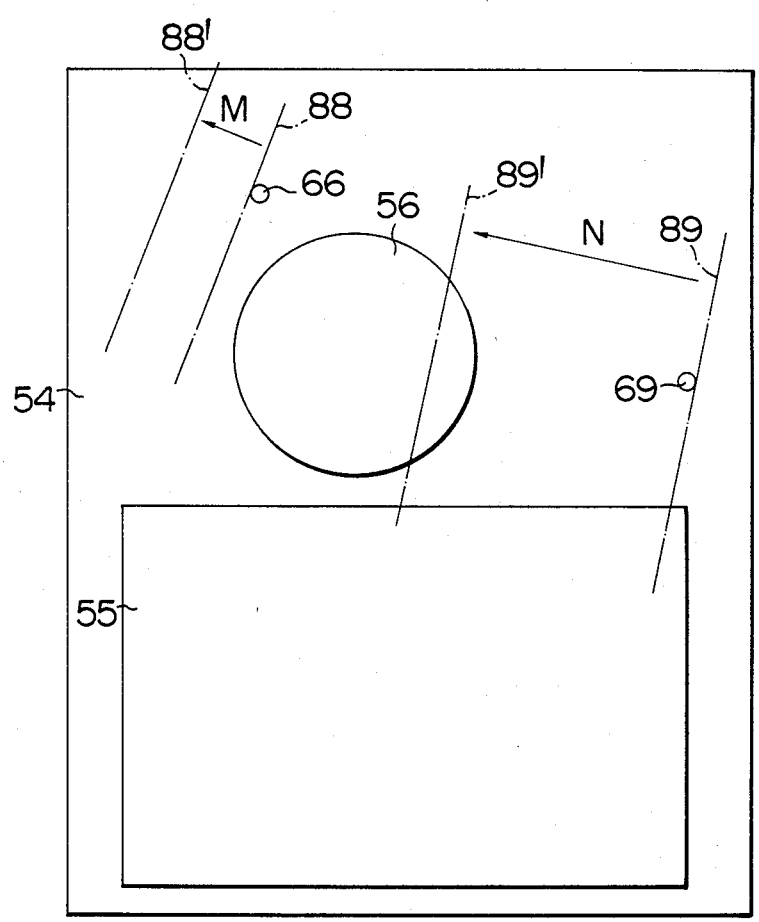
FIG. 7 is an illustration of the position of an inclined post.

FIG. 7 shows a planar positional relationship in which the reference numeral 89 denotes a line of intersection similar to that 88 mentioned above and imagined in relation to the second inclined plane. The inclined loading post 69 is positioned as illustrated in the vicinity of the line 89 of intersection. If the cylinder 56 solely is raised slightly with respect to the base plate 54 without changing the planar positional relationship between the cylinder 56 and the cassette 55, the lines 88,89 of intersection are shifted to positions indicated at 88′,89′. The rise of the cylinder 56 results in the rise of the third inclined plane 87 above the base plate 54, so that the line 88 is moved translationally away from the cylinder 56 in the direction indicated by M. To the contrary, in the case of the second inclined plane, the line 89 of intersection gradually approaches the cylinder 56 as indicated by an arrow N because the second inclined plane is inclined toward the cylinder 56. As will be clearly understood from the Figure, it is more convenient that the lines of intersection take the positions denoted by 88,89 than the positions indicated at 88′,89′ in consideration of design and reduction in size of the tape path.

For instance, it is assumed here that the second inclined plane is eliminated, i.e. that the capstan 79 and other components are mounted perpendicularily to the base plate 54 and the cylinder 56 is inclined by the guide angle in the direction parallel to the tape running away therefrom as in the case of the U type loading. In such a case, the level of the cylinder 56 is higher than that in the apparatus of the invention by an amount corresponding to the height reduction which might have been given by the presence of the second inclined plane. Therefore, as will be seen from FIG. 7, the line of intersection corresponding to the line 88 as in the invention would be more distant than the latter. Obviously, the maximum height $h_{max}$ of the tape 57 is increased disadvantageously as the level of the cylinder 56 is increased.

An embodiment of the tape path in accordance with the invention has been described. A description will be made hereinunder as to the loading method for forming the tape path of the invention.

Figure 8:
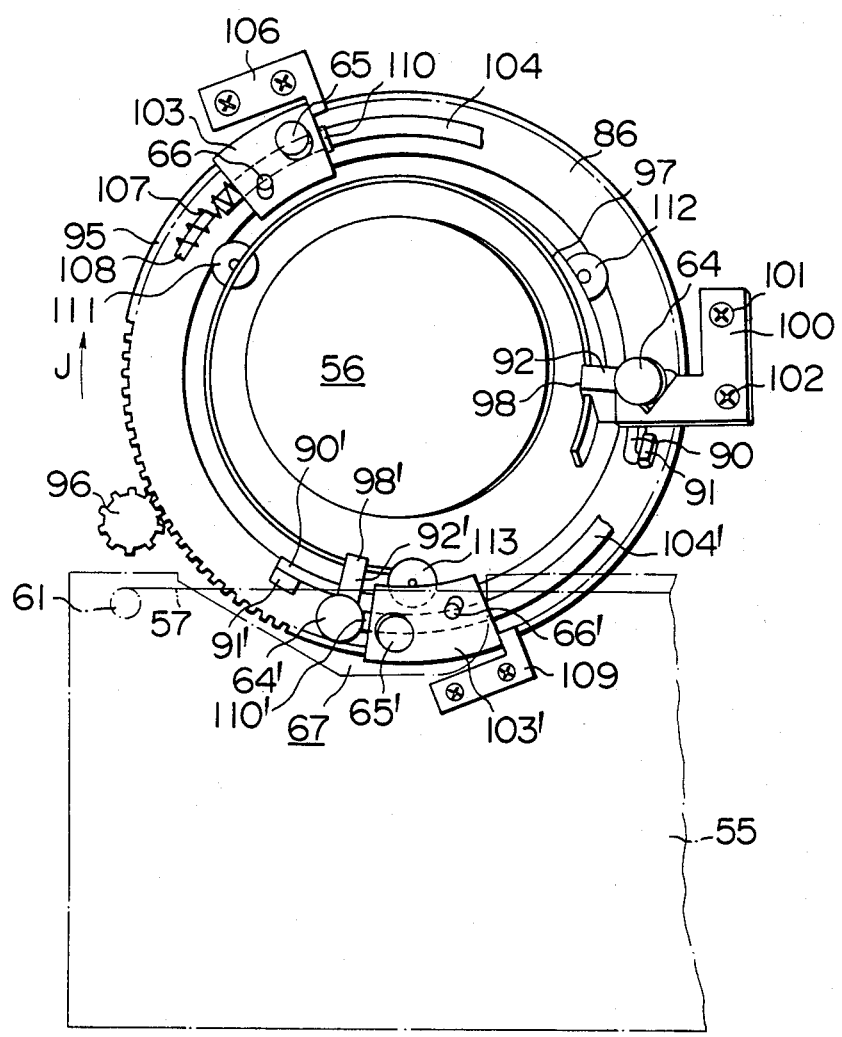
FIG. 8 is a plan view of a loading structure for achieving the tape path in accordance with the invention.
Figure 9:
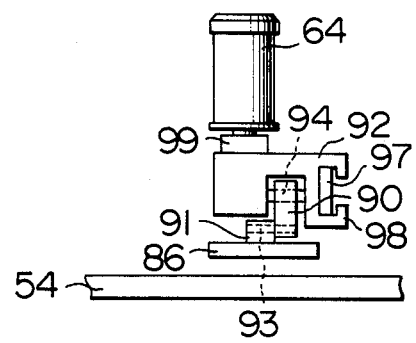
FIG. 9 and 10 are side elevational views showing the construction of the loading post.
Figure 10:
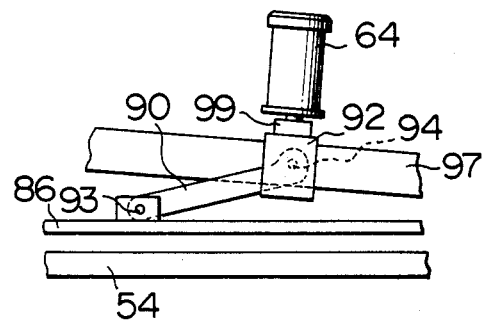

First of all, the loading by the loading post 64 will be explained with reference to FIGS. 8 to 10. The loading post denoted by 64′ is received by the notch 67 formed in the cassette 55. The loading post 64 is then moved to the position denoted by 64 by rotation (arrow J) of the loading ring 86 which is held in such a manner as to be able to rotate in parallel with the base plate 54 which is omitted from these Figures. The connection between the loading ring 86 and the loading post 64 is achieved by a connecting rod 90. Numerals having suffix ′ (dash) denote the members when they are positioned within the notch 67 of the cassette. The connecting rod 90 is pivotally secured by means of pins 93,94 to a hooker 91 fixed to the loading ring 86 and to a supporting portion 92 of the loading post 64, thereby to transmit the torque of the loading ring 86 to the supporting portion 92. The loading ring 86 is provided at its periphery with a gear 95 which meshes with a drive gear 96 so as to be driven by the latter. A guide ring 97 is provided at the inside of the loading ring 86. The supporting portion 92 of the loading post 64 is provided with a hook-shaped connecting portion 98 which engages with the guide ring 97 as shown in FIG. 9 so that the height and inclination of the loading post 64 is changeable in accordance with the shape of the guide ring 97.

The guide ring 97 is finally fixed in parallel with the third inclined surface mentioned before. Namely, the guide ring 97 is adapted to smoothly shift the loading post 64 to the posture twisted relatively to the base plate 54. The supporting portion 92 of the loading post 64 is provided with a cylindrical portion 99 which abuts a V shaped stopper 100 to complete the tape loading. The V shaped stopper 100 is fixed by means of screws 101, 102 to the second inclined plane, and the position of the loading post 64 is determined by a cooperation between the guide ring 97 and the V shaped stopper 100.

Figure 11:
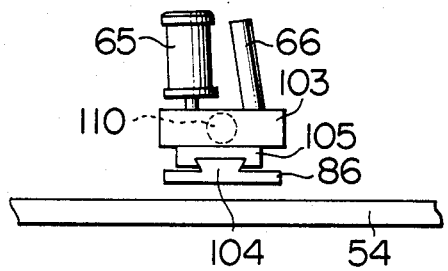
FIG. 11 and 12 are side elevational views showing another construction of the loading post.
Figure 12:
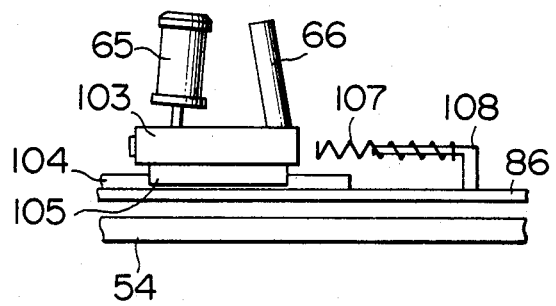

The tape loading cooperation of the loading post 65 and the inclined loading post 66 will be explained hereinunder with reference to FIGS. 11 and 12. These two posts are arranged beforehand on the loading block 103 so that these may take positions at predetermined heights along a tape path which is established after tape loading. Therefore, the tape loading of these posts can be made merely by a translational rotation of the loading block 103. As shown in FIG. 11, the loading ring 86 is provided with a projection 104 adapted to be engaged by a recess 105 provided at the lower side of the loading block 103 so that the loading block 103 is slidable on the loading ring 86 overcoming the friction acting therebetween. As the loading is started from the initial state in the cassette 55, the loading post 64, the loading post 65 and the inclined loading post 66 are moved at an equal speed in accordance with the rotation of the loading ring 86 in the direction of the arrow J. Then, the loading post 64 gradually starts to rise while being inclined at such an angle as to wind the tape 57 round the cylinder 56 in confirmity with the shape of the guide ring 97. Then, the tape loading is finished at the loading block 103 by the action of a stopper 106, and the loading post 64 alone is rotated further. Needless to say, the loading post 64 and the stopper 106 are so positioned as not to interfere each other in this state.

Then, the loading block 103 slides on the loading ring 86. Finally, the cylindrical portion 99 of the loading post 64 comes into contact with the V shaped stopper 100 to complete the tape loading operation and the loading ring 86 stops its rotation. Thus, the projection 104 of the loading ring 86 has to be held over such a region as not to go away from the recess 105 of the loading block 103 until the loading block 103 slides to this final position. Just before the loading post 64 abuts the V shaped stopper 100, the spring 107 pushes the loading block 103 from the rear side so that the positioning is completed without pressing heavily the loading block 103 against the stopper 106.

The spring 107 is guided by an L-shaped projection 108 provided on the loading ring 86, and is fixed at its one end to the projection 108. FIG. 12 shows the state immediately before the spring 107 reaches the loading block 103.

An explanation will be made hereinunder as to the operation for returning the tape 57 winding round to the cylinder 56 to the cassette 55, i.e. the tape unloading operation.

For unloading, the drive gear 96 is rotated in the reverse direction (clockwise direction) to the direction of rotation in the loading operation, so that the loading ring 86 is rotated in the direction opposite to the arrow J. The loading post 64 is moved directly in the unloading direction but the loading block 103 is kept in contact with the stopper 106 until the pressing force of the spring 107 becomes null. Then, as the spring 107 is moved away from the loading block 103 by the rotation of the loading ring 86, the loading block 103 starts to move in the unloading direction together with the loading ring 86 to the cassette due to the friction acting therebetween until it is stopped by the stopper 109. The tape unloading operation is further continued so that the loading post 64 also is returned into the cassette 55 and the supporting portion 92 comes into contact with the front end projection 110 of the loading block 103 which acts as a positioning member although the positioning is made indirectly. The tape unloading operation is thus completed and the whole part of the apparatus resumes the initial state. Reference numerals 111,112 and 113 denote holders for rotating the loading ring 86.

An explanation will be made hereinunder with specific reference to FIGS. 15 thru 17 as to the behaviour of the eraser head 73 in FIG. 3 during the tape loading and unloading, i.e. the mechanism for keeping the eraser head 73 clear from the path of movement of the loading posts.

Figure 15:
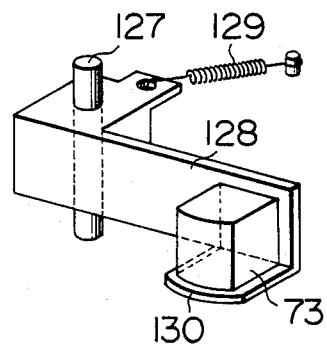
FIG. 15 is a perspective view of an eraser head.

FIG. 15 shows the construction of the eraser head 73. The eraser head 73 is secured to a head holder 128 which is rotatably held by a shaft 127 perpendicular to the third inclined plane, so as to be able to rotate within the third inclined plane. The head holder 128 is biased by a spring 129, and a guide portion 130 is provided at the lower side of the eraser head 73 to project slightly ahead of the eraser head 73. This guide portion 130 may be provided on either one of the eraser head 73 and the head holder 128 but has to be integral with the eraser head 73 in the assembled state.

Figure 16:
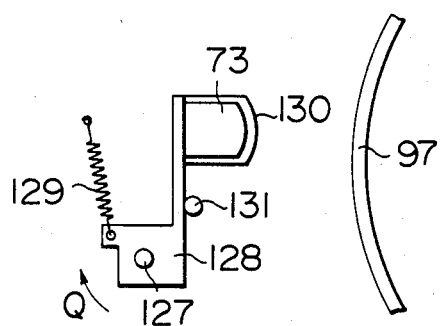
FIGS. 16 and 17 are plan views showing the operation of the eraser head.
Figure 17:
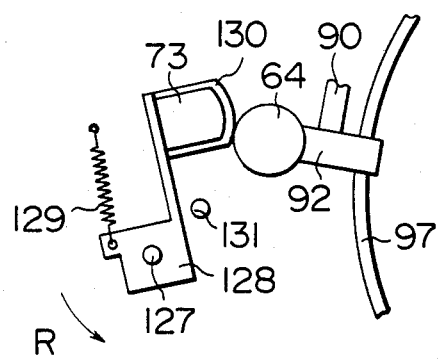

FIGS. 16 and 17 are plan views of the eraser head 73 as viewed in the direction perpendicular to the inclined plane. FIG. 16 shows the state in which the loading post 64 has not passed yet, which in turn shows the position of the eraser head 73 for forming the correct tape path. A reference numeral 97 designates the guide ring mentioned before. The head holder 128 is held at this position by the stopper 131.

In FIG. 17, the eraser head 73 is shown in the state in which the loading post 64 is just passing thereby. As will be seen from this Figure, as the loading post 64 passes along the guide ring 97, the guide portion 130 of the head holder 128 is brought into contact with the loading post 64 and is slightly rotated in the direction of an arrow R overcoming the biasing force of the spring 129. As the loading post 64 passes by the eraser head 73, the head holder 128 is returned to the initial state by the action of the spring 129, i.e. to the state shown in FIG. 16. The same mechanism applies to the movement of the guide post 72.

Figure 14:
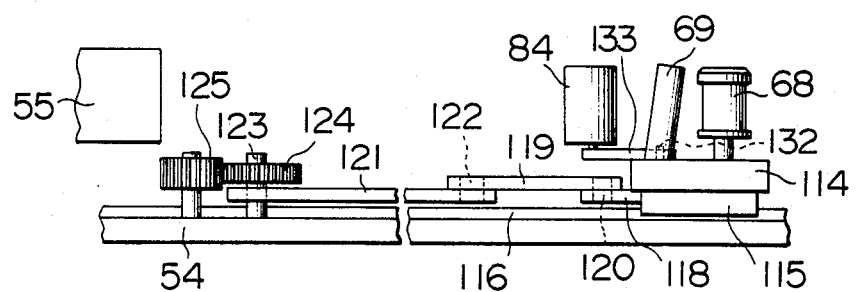
FIG. 14 is a side elevational view of an essential part of a loading arrangement shown in FIG. 13.

Finally, a brief explanation will be made hereinunder with reference to FIGS. 3,13 and 14, as to the loading mechanism for the loading post 68, inclined post 69 and the pinch roller 84. These posts 68,69 and the pinch roller 84 are beforehand mounted on the loading block 114 at the predetermined angle of inclination and the predetermined height suitable for forming a correct tape path in the state after completion of the loading. As will be understood from the foregoing description, the loading post 68 and the pinch roller 84 take the same inclined plane. Particularly, the pinch roller 84 is mounted through an arm 133 in such a manner as to be able to rotate in this plane around a fulcrum 132. In this state, the loading block 114 makes a translational rotational movement relative to the base plate 54 in such a manner as to shift the members to the correct positions 68,69 and 84 from the positions 68',69' and 84' in the notch 70 in the cassette 55, as in the case of the loading of the loading post 65 and the inclined loading post 66 explained before. Furthermore, the recess 115 provided at the lower side of the loading block 114 engages the projection 116 on the base plate 54 so that the loading block 114 is slidable on the base plate 54 along the configuration of the projection 116.

Therefore, the projection 116 is provided as to guide the loading block 114 from the position in the notch 70 in the cassette 55 clearing the capstan 79 until the loading block 114 is stopped by the stopper 117. A joint lever 119 is pivotally secured by a pin 120 to a joint portion 118 provided at the rear side of the loading block 114. The joint lever 119 is pivotally connected also to the loading lever 121 by a pin 122. A gear 124 integral with the loading lever 121 and provided at the fulcrum 123 of the loading lever 121 meshes with a drive gear 125. The arrangement is such that, as the drive gear 15 is rotated counter-clockwise, the gear 124 meshing therewith is rotated to swing the loading lever 121 in the direction of an arrow P. Since the loading block 114 moves along the path presented by the projection 116 while the loading lever 121 scribes an arcuate path around the fulcrum 123, the joint lever 119 is rocked by the combination of the movements of the members 121 and 114. The unloading operation is achieved by reversing the drive gear 125. The positioning in the cassette 55 is made by cooperation between the stopper pin 126 and the loading lever 121. The loading lever 121 has a flexed form as illustrated in order to keep itself clear of the take-up reel base 134. Although not shown in FIG. 13, the guide post 85 shown in FIG. 3 keeps itself clear of the path of the loading block 114, by a mechanism similar to the aforementioned mechanism for the eraser head 73.

An example of the loading method for forming the tape path in accordance with the invention has been described.

Various problems concerning the M type loading and U type loading are perfectly overcome by the adoption of the tape path in accordance with the invention.

Thus, the tape path and tape loading in accordance with the invention offer the following advantages.

1. All guide posts and heads for constituting the tape path and arranged in a range between the cylinder and the drive system constituted by the capstan and the pinch roller are fixed so that the distance between the cylinder and the fixed head can be managed and controlled easily. For the same reason, the correct contact of the tape with all heads is ensured. Also eliminated are various problems such as complication of the construction due to the employment of a large number of movable parts, the rise of production cost attributable to the requirement for the precision in positioning and difficulty in assembling due to employing of a large number of parts.

2. Since the tape winding angle round the tape guide between the cylinder and the capstan can be reduced, it is not necessary to employ a roller in this region, nor the inclined post is required in this region because there is no twist of the tape in this region. In consequence, the running of the tape is stabilized remarkably to eliminate the undesirable wow, flutter and jitter.

3. The small tape winding angle round the inclined post reduces the take-up torque which in turn diminish damage to the tape.

4. Although the components of the tape drive system are fewer, the thickness of the apparatus is not changed substantially from that obtained in the case of that these components are arranged perpendicularly, because the angle of inclination of the second inclined plane is extremely small.

5. The tape path and tape loading in accordance with the invention advantageously contribute to the reduction in thickness of the VTR, because the major loading members such as loading ring are arranged in parallel with the base plate.

6. The presence of the second inclined plane permits the cylinder to be arranged somewhat below the cassette surface so that the amount of rise of the tape due to winding round the cylinder is reduced and the tape loop itself can be made compact. In consequence, the space occupied by the tape path can be reduced advantageously to further contribute to the reduction in thickness of VTRs 7. Since the loading tape can be made along the guide of the cylinder, the damage of the tape during loading is minimized.

To sum up, the tape path in accordance with the invention can remarkably reduce the size and thickness of the VTR without deteriorating the performance of VTR such as running, while simplifying the construction and facilitating the assembling to lower the production cost. In addition, a sufficient consideration is paid to the protection of the tape to realize an optimum mechanism to remarkably contributes to the future progress of VTR.

What is claimed is:

1. A magnetic recording and playback apparatus, in which a magnetic tape is extracted by means of a tape extracting pin from a tape cassette and wound around a cylinder incorporating therein rotary heads over a predetermined angle so that said rotary heads record and play back signals on said magnetic tape, said apparatus comprising a base plate for holding reel bases vertically and for mounting thereon said tape cassette in parallel therewith, and first, second and third inclined guide planes of different directions and angles of inclination with respect to said base plate, said cylinder incorporating therein said rotary heads arranged perpendicularly on said first inclined plane, said apparatus further comprising a first guide post and an eraser head arranged perpendicularly with respect to said third inclined plane, a second guide post, a sound/control head and a capstan arranged perpendicularly with respect to said second inclined plane, means for bringing and keeping a pinch roller into a posture perpendicular to said second inclined plane during travelling of a tape, and first and second inclined posts arranged in the vicinity of intersecting lines of said base plate and said third inclined plane, and of said base plate and said second inclined plane, respectively, said first inclined post being adapted to stretch a magnetic tape extracted by said tape extracting pin from said tape cassette, along said third inclined plane before said magnetic tape is wound around said cylinder by way of said first guide post and said eraser head, and said second inclined post being adapted to redirect said magnetic tape which comes from said cylinder and travels by way of said second guide post, said sound/control head and said capstan arranged on said second inclined plane, so that the magnetic tape stretches in parallel with said base plate.

2. A magnetic recording and playback apparatus according to claim 1, wherein said second inclined plane is so defined that the end thereof adjacent to said cylinder is below the position where said capstan is provided.

3. A magnetic recording and playback apparatus according to either one of claims 1 and 2, wherein the angle of inclination of said first inclined plane with respect to said base plate is selected to be somewhat greater than the angle of lead on said cylinder.

4. A magnetic recording and playback apparatus according to claim 3, wherein said second inclined plane is inclined with respect to said base plate by an angle which is not greater than about 5°.

5. A magnetic recording and playback apparatus according to claim 4, further comprising a plurality of loading posts which are adapted to be inserted into said cassette and to be shifted in such a manner as to wind said tape around said cylinder, and a ring for shifting said loading posts to a predetermined position, said ring being held in parallel with said base plate.

6. A magnetic recording and playback apparatus according to either one of claims 4 and 5, wherein said eraser head in said third inclined plane is mounted in such a manner as to be rotatable in said third inclined plane.

* * * * *